(12) United States Patent
Kim et al.

(10) Patent No.: US 7,064,348 B2
(45) Date of Patent: Jun. 20, 2006

(54) VVA-MODE LIQUID CRYSTAL DISPLAY

(75) Inventors: Sung Woon Kim, Kyoungki-do (KR); Sang Un Choi, Kyoungki-do (KR)

(73) Assignee: Boe Hydis Technology Co., Ltd., Kyoungki-Do (KR)

( * ) Notice: Subject to any disclaimer, the term of this patent is extended or adjusted under 35 U.S.C. 154(b) by 0 days.

(21) Appl. No.: 11/142,029

(22) Filed: Jun. 1, 2005

(65) Prior Publication Data
US 2006/0102898 A1 May 18, 2006

(30) Foreign Application Priority Data
Nov. 17, 2004 (KR) ................ 10-2004-0093967

(51) Int. Cl.
*H01L 29/04* (2006.01)
*H01L 31/036* (2006.01)
*H01L 31/0376* (2006.01)
*H01L 31/20* (2006.01)

(52) U.S. Cl. .......................... 257/59; 257/72
(58) Field of Classification Search .......... 257/59, 257/72; 349/130
See application file for complete search history.

(56) References Cited
U.S. PATENT DOCUMENTS
2004/0080695 A1* 4/2004 Choi et al. ............ 349/130
2004/0201790 A1* 10/2004 Shin et al. ............ 349/56
2004/0252265 A1* 12/2004 Ma et al. ............... 349/130

* cited by examiner

*Primary Examiner*—Phat X. Cao
(74) *Attorney, Agent, or Firm*—Timothy J Keefer; Seyfarth Shaw LLP

(57) ABSTRACT

A VVA-mode LCD having improved transmittance and response speed includes upper and lower substrates positioned to face each other with a predetermined distance between them; a liquid crystal layer having negative anisotropy of dielectric constant interposed between the upper and lower substrates; a color resin layer formed on the inner surface of the upper substrate and having a predetermined number of valleys regularly formed inside each unit pixel; a counter electrode formed on the color resin layer including the valleys; a pixel electrode formed on the inner surface of the lower substrate and having slits arranged about the valleys of the upper substrate in a "+" shape inside and around the valleys; and alignment layers interposed between the pixel electrode and the liquid crystal layer and between the counter electrode and the liquid crystal layer, respectively.

3 Claims, 3 Drawing Sheets

VVA-MODE LIQUID CRYSTAL DISPLAY

BACKGROUND OF THE INVENTION

1. Field of the Invention

The present invention relates to a VVA (valley vertical align)-mode liquid crystal display (LCD), and more particularly to a VVA-mode LCD having improved transmittance and response speed.

2. Description of the Prior Art

LCDs have been developed to replace CRTs. In particular, TFT LCDs have a colorful display screen of excellent quality and large size, comparable to that of CRTs, and are highly visible in the laptop computer, PC, and monitor markets. Furthermore, they are expected to encroach on the TV market.

In general, LCDs using vertical alignment distort the electrical field applied to upper and lower substrates to align liquid crystals in two or four directions for an improved viewing angle. In VVA-mode LCDs, a pinwheel structure is currently proposed wherein the electrical field is distorted in a circular shape to drive liquid crystals in a pinwheel configuration to improve the viewing angle. Instead of placing protrusions or slits on the upper substrate as a tilting source, valleys are formed as a tilting source to lay the liquid crystals in a pinwheel configuration for an improved viewing angle.

In addition, a process for forming circular grooves on the upper or lower substrate to form valleys is performed, instead of a process for forming protrusions on the upper substrate, to form color filters on the upper substrate together with valleys. This simplifies the process and reduces transmittance loss by forming disclination lines at the center of the valleys.

A conventional VVA-mode LCD will now be described.

Although not shown, a lower substrate and an upper substrate having a pixel electrode and a counter electrode, respectively, are bonded to each together with a liquid crystal layer having negative anisotropy of dielectric constant interposed between them. Vertical alignment layers are interposed between the lower substrate and the liquid crystal layer and between the upper substrate and the liquid crystal layer, respectively. Polarization plates are attached to the rear surfaces of the facing surfaces of the substrates, respectively, in such a manner that their polarization axes cross each other.

Color resin layers of red (R), green (G), and blue (B) are interposed between the upper substrate and the counter electrode to implement respective colors. The color resin layers have a number of (e.g., 2–10) valleys regularly formed thereon in each portion corresponding to a pixel.

However, disclination lines A inevitably occur about the valleys 3, as shown in FIG. 1A. This reduces transmittance and degrades response characteristics. Reference numeral 1 refers to a pixel electrode, 2 is a slit pattern, and 4 is a liquid crystal.

A number of valleys 3 formed at the center of the upper substrate, as shown in FIG. 1B, provide a tilting source. This results in losses of transmittance and color characteristics. Reference numeral 6 refers to a data line, 7 is a gate line, and 8 is a TFT. In particular, the distance between the valleys and the slits affects driving stability and response speed and, if the distance increases, they degrade. The size of the valleys must increase, therefore, for improved driving stability and response speed. However, this deteriorates color reproduction property.

SUMMARY OF THE INVENTION

Accordingly, the present invention has been made to solve the above-mentioned problems occurring in the prior art, and an object of the present invention is to provide a VVA-mode LCD having improved transmittance and response speed.

In order to accomplish this object, there is provided a VVA-mode LCD including upper and lower substrates positioned to face each other with a predetermined distance between them; a liquid crystal layer having negative anisotropy of dielectric constant interposed between the upper and lower substrates; a color resin layer formed on the inner surface of the upper substrate and having a predetermined number of valleys regularly formed inside each unit pixel; a counter electrode formed on the color resin layer including the valleys; a pixel electrode formed on the inner surface of the lower substrate and having slits arranged about the valleys of the upper substrate in a "+" shape inside and around the valleys; and alignment layers interposed between the pixel electrode and the liquid crystal layer and between the counter electrode and the liquid crystal layer, respectively, wherein the valleys are formed in a ring shape with reduced gaps between the valleys and slit patterns to generate transmittance both inside and outside the valleys and avoid loss of transmittance and degradation of color reproduction property.

The valleys are formed in the shape of a circular or polygonal ring.

The slits are positioned inside and outside the valleys of the upper substrate in different shapes in a direction to control the direction of the electric field formed between the valleys and the slits.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1A:
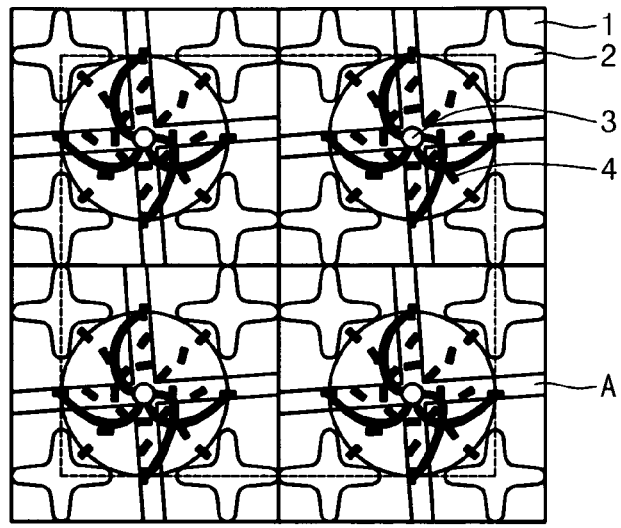
FIGS. 1A and 1B show a conventional VVA-mode LCD.
Figure 1B:
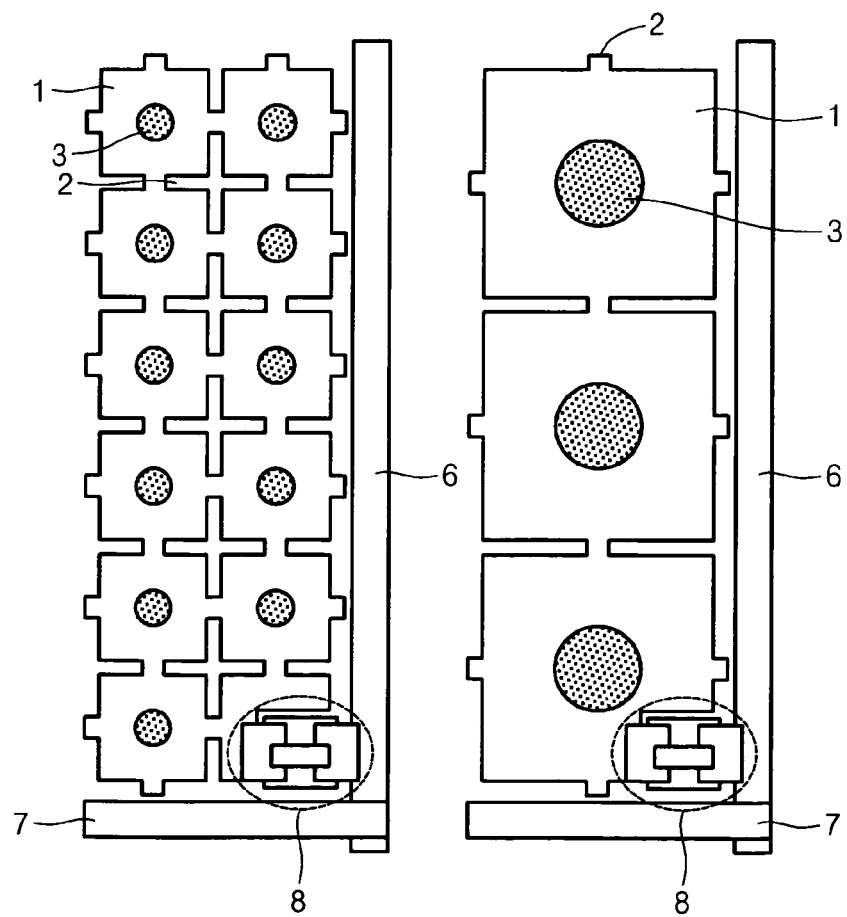

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 2:
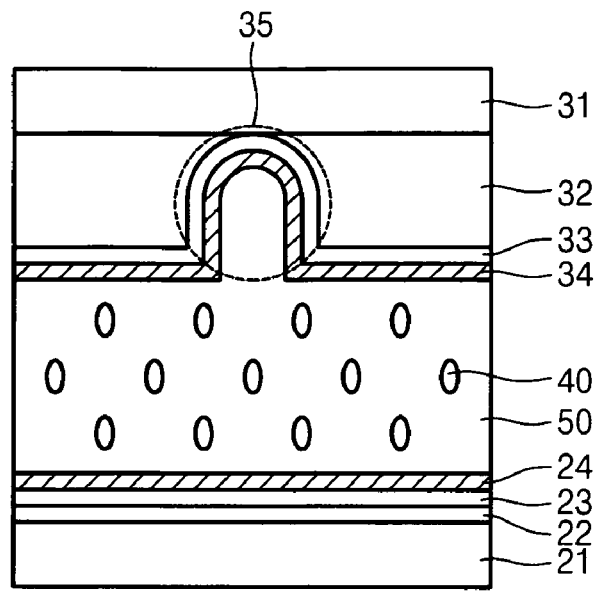
FIG. 2 is a sectional view showing a VVA-mode LCD according to an embodiment of the present invention.

FIG. 2 is a sectional view showing a VVA-mode LCD according to an embodiment of the present invention.

As shown in FIG. 2, a VVA-mode LCD according to the present invention includes a color resin layer 32 having valleys on the inner surface thereof, a counter electrode 33 formed on the color resin layer 32, an upper substrate 31 having an alignment layer 34 formed on the counter electrode 33, a pixel electrode 23 having an insulation layer 22 formed on the inner surface thereof and slits formed on the insulation layer 22, a lower substrate 21 having an alignment layer formed on the pixel electrode 23, and a liquid crystal layer 50 having negative anisotropy of dielectric constant interposed between the upper and lower substrates. The lower and upper substrates 21 and 31 have polarization plates (not shown) attached to the rear surfaces of the facing surfaces thereof, respectively, in such a manner that their polarization axes cross each other.

Figure 3:
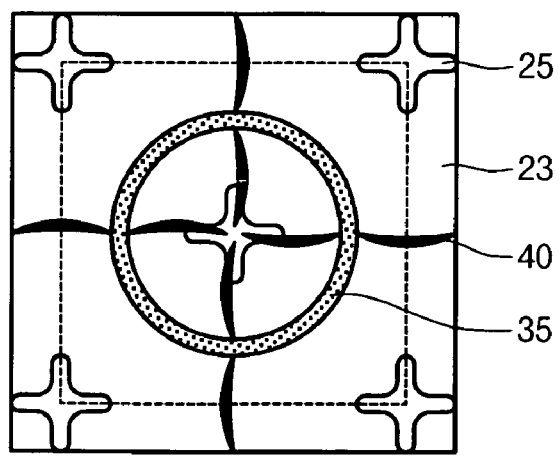
FIG. 3 is a top view showing a pixel of a VVA-mode LCD according to an embodiment of the present invention.

FIG. 3 is a top view showing a pixel of a VVA-mode LCD according to an embodiment of the present invention.

According to the present invention, the valleys 35 are formed in a ring shape, as shown in FIG. 3, for improved transmittance and response speed. Slit patterns 25 are formed on the pixel electrode 23 of the lower substrate 21 corresponding to the valleys of the upper substrate 31 and the gaps between the valleys 35 and the slit patterns 25 are reduced both inside and outside the ring-shaped valleys 35 to generate transmittance also inside the valleys 35. This improves transmittance and secures driving stability. As a result, response speed improves. The slit patterns 25 are formed in a "+" shape. Alternatively, they are formed in a clamp or stripe shape for reduced viewing angle and disclination lines.

Figure 4:
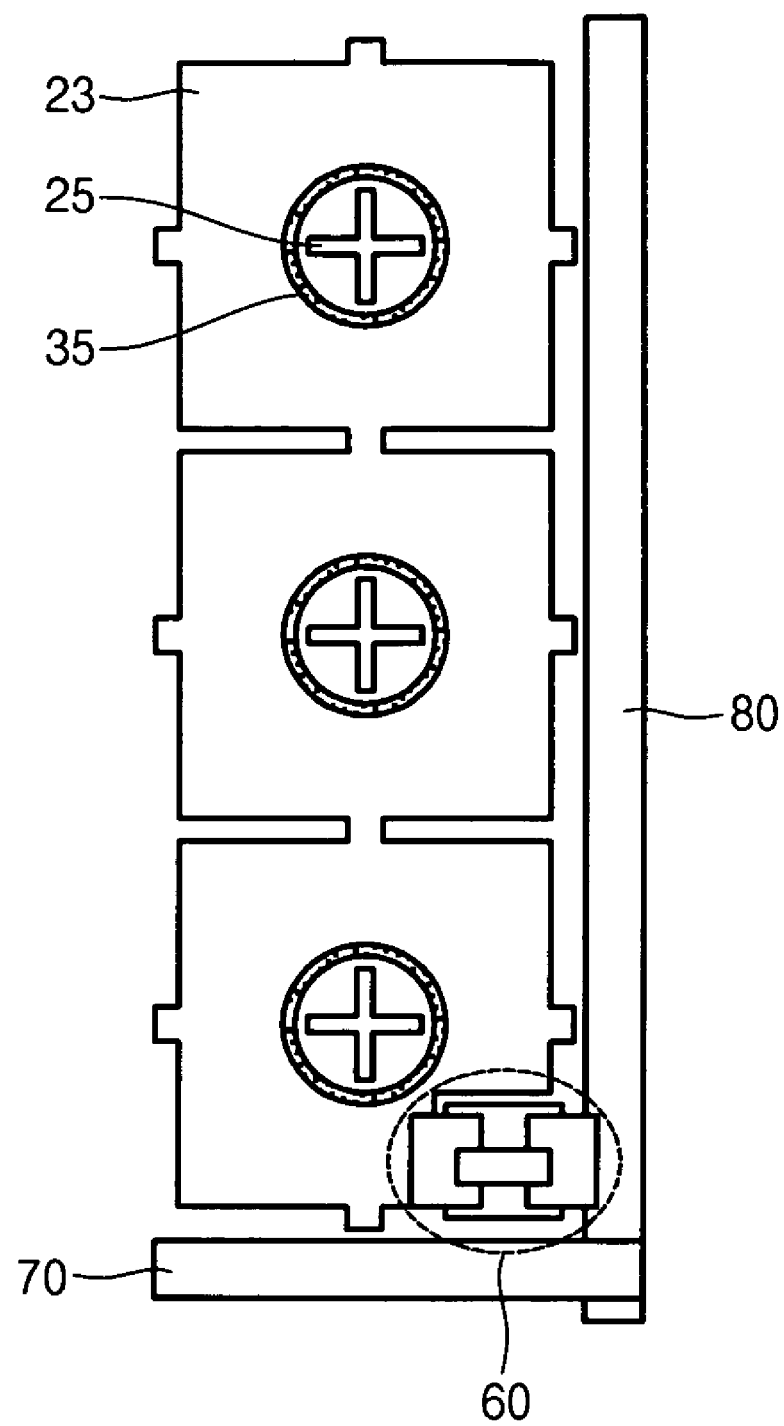
FIG. 4 shows a sub-pixel of a VVA-mode LCD according to an embodiment of the present invention.

FIG. 4 shows a sub-pixel of a VVA-mode LCD according to an embodiment of the present invention.

As shown in FIG. 4, a gate line 70 and a data line 80 are formed while crossing each other. A TFT 60 is formed in a region where the gate and data lines 70 and 80 cross each other. Slit patterns 25 are formed on the pixel electrode 23 of the lower substrate 21 corresponding to the valleys of the upper substrate 31. The slit patterns 25 of the pixel electrode 23 are formed inside and outside the valleys 35 in any shape chosen from a "+" shape, a clamp shape, and a stripe shape.

As mentioned above, the VVA-mode LCD according to the present invention has valleys formed on the upper substrate in a ring shape and slit patterns of a pixel electrode formed inside and outside the valleys while reducing the gaps between the valleys and the slit patterns to generate transmittance both inside and outside the valleys. This avoids loss of transmittance and degradation of color reproduction property. As the LCD's transmittance improves and driving stability is secured accordingly, response speed improves.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A VVA-mode liquid crystal display comprising:
   upper and lower substrates positioned to face each other with a predetermined distance between them;
   a liquid crystal layer having negative anisotropy of dielectric constant interposed between the upper and lower substrates;
   a color resin layer formed on the inner surface of the upper substrate and having a predetermined number of valleys regularly formed inside each unit pixel;
   a counter electrode formed on the color resin layer including the valleys;
   a pixel electrode formed on the inner surface of the lower substrate and having slits arranged about the valleys of the upper substrate in a "+" shape inside and around the valleys; and
   alignment layers interposed between the pixel electrode and the liquid crystal layer and between the counter electrode and the liquid crystal layer, respectively, wherein
   the valleys are formed in a ring shape with reduced gaps between the valleys and slit patterns to generate transmittance both inside and outside the valleys and avoid loss of transmittance and degradation of color reproduction property.

2. The VVA-mode liquid crystal display as claimed in claim 1, wherein the valleys are formed in the shape of a circular or polygonal ring.

3. The VVA-mode liquid crystal display as claimed in claim 1, wherein the slits are positioned inside and outside the valleys of the upper substrate in different shapes.

* * * * *